(12) United States Patent
Ogasawara et al.

(10) Patent No.: US 12,512,273 B2
(45) Date of Patent: Dec. 30, 2025

(54) SOLID ELECTROLYTIC CAPACITOR

(71) Applicant: Panasonic Intellectual Property Management Co., Ltd., Osaka (JP)

(72) Inventors: Katsuhiro Ogasawara, Kyoto (JP); Atsushi Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 240 days.

(21) Appl. No.: 18/252,053

(22) PCT Filed: Nov. 25, 2021

(86) PCT No.: PCT/JP2021/043139
§ 371 (c)(1),
(2) Date: May 8, 2023

(87) PCT Pub. No.: WO2022/114047
PCT Pub. Date: Jun. 2, 2022

(65) Prior Publication Data
US 2023/0411084 A1    Dec. 21, 2023

(30) Foreign Application Priority Data
Nov. 30, 2020   (JP) .................................. 2020-198303

(51) Int. Cl.
*H01G 9/012*   (2006.01)
*H01G 9/15*   (2006.01)

(52) U.S. Cl.
CPC ............... *H01G 9/012* (2013.01); *H01G 9/15* (2013.01)

(58) Field of Classification Search
CPC ................................. H01G 9/15; H01G 9/012
(Continued)

(56) References Cited

U.S. PATENT DOCUMENTS

| 6,036,734 A | 3/2000 | Taketani et al. |
| 6,229,687 B1 * | 5/2001 | Wada ..................... H01G 9/012 |
| | | 361/534 |

(Continued)

FOREIGN PATENT DOCUMENTS

| JP | 02-239608 | 9/1990 |
| JP | 04-253314 | 9/1992 |

(Continued)

OTHER PUBLICATIONS

International Search Report of PCT application No. PCT/JP2021/043139 dated Mar. 1, 2022.

*Primary Examiner* — Arun Ramaswamy
(74) *Attorney, Agent, or Firm* — Rimon P.C.

(57) ABSTRACT

A solid electrolytic capacitor includes at least one capacitor element including an anode part and a cathode part, an anode lead terminal, a cathode lead terminal, and an exterior body that covers the least one capacitor element. Each of the anode lead terminal and the cathode lead terminal includes an embedded part embedded in the exterior body. The embedded part of the anode lead terminal has a first contact surface in contact with the exterior body, and the embedded part of the cathode lead terminal has a second contact surface in contact with the exterior body. At least one contact surface selected from the group consisting of the first contact surface and the second contact surface includes a rough surface having a developed area ratio of an interface of more than or equal to 0.4.

7 Claims, 2 Drawing Sheets

(58) Field of Classification Search
USPC .................................. 361/523, 540, 533, 538
See application file for complete search history.

(56) References Cited

U.S. PATENT DOCUMENTS

| | | | |
|---|---|---|---|
| 2002/0075634 A1* | 6/2002 | Uenishi | H01G 9/012 |
| | | | 361/523 |
| 2004/0023442 A1* | 2/2004 | Konuma | H01G 9/15 |
| | | | 438/141 |
| 2009/0237865 A1* | 9/2009 | Komazawa | H01G 9/012 |
| | | | 29/25.03 |
| 2017/0110389 A1* | 4/2017 | Hayashi | H01L 24/97 |
| 2017/0365419 A1* | 12/2017 | Demizu | H01G 9/15 |

FOREIGN PATENT DOCUMENTS

| | | | | |
|---|---|---|---|---|
| JP | 11-283870 | | 10/1999 | |
| JP | 2000-049056 | | 2/2000 | |
| JP | 2000-340463 | | 12/2000 | |
| JP | 2019207905 A | * | 12/2019 | ............. H01L 27/10 |
| JP | 2020-053588 | | 4/2020 | |

* cited by examiner

SOLID ELECTROLYTIC CAPACITOR

CROSS-REFERENCE TO RELATED APPLICATIONS

This application is a U.S. national stage application of the PCT International Application No. PCT/JP2021/043139 filed on Nov. 25, 2021, which claims the benefit of foreign priority of Japanese patent application No. 2020-198303 filed on Nov. 30, 2020, the contents all of which are incorporated herein by reference.

TECHNICAL FIELD

The present disclosure relates to a solid electrolytic capacitor.

BACKGROUND

A solid electrolytic capacitor includes a capacitor element including a solid electrolyte layer, a lead terminal electrically connected to the capacitor element, and an exterior body that seals the capacitor element.

The exterior body prevents oxygen and moisture in the atmosphere from reaching the capacitor element and deteriorating the capacitor element. However, when adhesion at an interface between the lead terminal and the exterior body is low, oxygen and moisture easily intrude though the interface, and the solid electrolytic capacitor deteriorates.

Unexamined Japanese Patent Publication No. H4-253314 discloses "a solid electrolytic capacitor in which a capacitor element is formed by sequentially forming an oxide film, a conductive material layer, a conductive polymer film, and a conductor layer on a surface of a valve metal, a lead frame serving as a lead-out terminal is connected to a valve metal portion and a conductor layer portion of the capacitor element, and a part of the capacitor element and the lead frame is covered with a mold resin, in which the lead frame has a copper metal layer on a surface thereof and the surface thereof is roughened.".

SUMMARY

A solid electrolytic capacitor according to one aspect of the present disclosure includes at least one capacitor element that includes an anode part and a cathode part, an anode lead terminal electrically connected to the anode part, a cathode lead terminal electrically connected to the cathode part, and an exterior body that covers the at least one capacitor element. Each of the anode lead terminal and the cathode lead terminal includes an embedded part and an exposed part. The embedded part is embedded in the exterior body. The exposed part is connected to the embedded part and is exposed from the exterior body. The embedded part of the anode lead terminal includes a first contact surface in contact with the exterior body, and the embedded part of the cathode lead terminal includes a second contact surface in contact with the exterior body. At least one contact surface selected from the group consisting of the first contact surface and the second contact surface includes a rough surface having a developed area ratio of an interface of more than or equal to 0.4.

According to the present disclosure, a solid electrolytic capacitor capable of particularly suppressing deterioration due to intrusion of oxygen or the like is obtained.

DESCRIPTION OF EMBODIMENT

Prior to the description of an exemplary embodiment, problems in the conventional technology will be briefly described below.

Currently, there is a need for further suppression of deterioration. In such a situation, the present disclosure provides a novel solid electrolytic capacitor capable of particularly suppressing deterioration due to intrusion of oxygen or the like.

In view of the above problems, the present disclosure provides an electrolytic capacitor for providing a solid electrolytic capacitor capable of suppressing deterioration due to intrusion of oxygen or the like, and a paste for forming a conductive layer of the electrolytic capacitor.

Hereinafter, an exemplary embodiment of the present disclosure will be described. Note that, in the following description, the exemplary embodiment of the present disclosure will be described by way of examples, but the present disclosure is not limited to the examples described below. In the following description, specific numerical values and materials are disclosed as examples in some cases, but other numerical values and materials may be applied as long as the effect of the present disclosure is obtained. In this specification, in a case where an expression "from a numerical value A to a numerical value B, inclusive" is used, the range includes the numerical value A and the numerical value B.

Solid Electrolytic Capacitor

A solid electrolytic capacitor according to the present exemplary embodiment includes at least one capacitor element including an anode part and a cathode part, an anode lead terminal electrically connected to the anode part, a cathode lead terminal electrically connected to the cathode part, and an exterior body that covers the at least one capacitor element. Each of the anode lead terminal and the cathode lead terminal includes an embedded part embedded in the exterior body, and an exposed part connected to the embedded part and exposed from the exterior body. The embedded part of the anode lead terminal has contact surface p (a first contact surface) in contact with the exterior body. The embedded part of the cathode lead terminal has contact surface n (a second contact surface) in contact with the exterior body. At least one contact surface selected from the group consisting of contact surface p and contact surface n includes a rough surface having a developed area ratio of an interface of more than or equal to 0.4. Hereinafter, the rough surface having the developed area ratio of the interface of more than or equal to 0.4 may be referred to as "rough surface (R)". The developed area ratio of the interface can be measured by a method to be described later.

As a method for improving adhesion between the lead terminal and the exterior body, a method for roughening surfaces of the lead terminal by a method such as a sand blasting method has been used in the related art. However, as a result of examination, the inventors of the present application have newly found that a sufficient effect may not be obtained even though the surfaces of the lead terminal are roughened by the method of the related art. The present disclosure has been based on this new finding.

When adhesion between the contact surface and the exterior body is low, oxygen or the like easily intrudes through an interface between the contact surface and the exterior body. Although it has not been known at all in the related art, as illustrated in Examples, since the contact surface has rough surface (R), the intrusion of oxygen or the like through the interface between the contact surface and the exterior body can be suppressed. This is considered to be because the adhesion between the contact surface and the exterior body is improved by the contact surface having rough surface (R).

Oxygen in the atmosphere or the like intrudes into the exterior body from surfaces of the exterior body. Thus, rough surface (R) is preferably formed from a boundary between the embedded part and the exposed part to the inside of the exterior body.

Rough surface (R) may be formed to extend from the embedded part to the exposed part to be also formed on at least a part of the exposed part. In the case of sealing with the exterior body, a position of an outer surface of the exterior body with respect to the lead terminal may be varied. By forming rough surface (R) to extend from the embedded part to the exposed part, the embedded part can reliably have rough surface (R).

In a case where rough surface (R) is also formed on the exposed part, a range of rough surface (R) to be formed is not particularly limited. Length L of rough surface (R) from the boundary between the embedded part and the exposed part (that is, a contact part between the exposed part and the exterior body) is preferably more than or equal to 0.3 mm, and may be more than or equal to 0.5 mm. Here, length L is a length along surfaces of the exposed part, and is an apparent length when it is assumed that the surface of the exposed part is smooth. An upper limit of length L is not particularly limited, and all the surfaces of the exposed part may be rough surfaces (R).

At least one contact surface selected from the group consisting of contact surface p and contact surface n includes rough surface (R). In a preferred example, each of contact surface p and contact surface n includes rough surface (R).

An effect of the present disclosure can be enhanced by increasing a ratio of rough surface (R) to the contact surface. A ratio of an area of rough surface (R) to an area of contact surface p is preferably more than or equal to 50%, more preferably more than or equal to 80% (for example, more than or equal to 90%). A ratio of the area of rough surface (R) to an area of contact surface n is preferably more than or equal to 50%, more preferably more than or equal to 80% (for example, more than or equal to 90%). All of contact surface p and contact surface n may be rough surfaces (R). Note that, here, the area is an apparent area and is an area when it is assumed that the surfaces are smooth.

Note that, the surfaces of the lead terminal may also have rough surface (R) on surfaces other than the contact surface in contact with the exterior body. For example, among surfaces of the cathode lead terminal, a surface electrically connected to the cathode part may include rough surface (R) having a developed area ratio of an interface of more than or equal to 0.4. The ratio of the area of rough surface (R) to an area of a surface of the embedded part may be more than or equal to 50%, more than or equal to 80%, or more than or equal to 90%. All surfaces of the embedded part may be rough surfaces (R).

As described above, a developed area ratio of an interface of rough surface (R) is more than or equal to 0.4. The developed area ratio of the interface of rough surface (R) is not particularly limited, but the lead terminal can be easily manufactured by setting the developed area ratio to be less than or equal to a certain value. The developed area ratio of the interface of rough surface (R) may be less than or equal to 10.0, less than or equal to 6.0, less than or equal to 4.0, less than or equal to 2.0, less than or equal to 1.0, or less than or equal to 0.6. The developed area ratio of the interface may be in a range defined by any of the upper limits and a lower limit (more than or equal to 0.4) described here. For example, the developed area ratio of the interface of rough surface (R) may be in a range from 0.4 to inclusive, in a range from 0.4 to 6.0, inclusive, in a range from 0.4 to 4.0, inclusive, in a range from 0.4 to 2.0, inclusive, in a range from 0.4 to 1.0, inclusive, or in a range from to 0.6, inclusive.

A preferred example of the solid electrolytic capacitor according to the present disclosure satisfies the following conditions (1) and (2), and may further satisfy condition (3).

(1) The ratio of the area of rough surface (R) to the area of contact surface p and the ratio of the area of rough surface (R) to the area of contact surface n are each more than or equal to 50%, and may be each more than or equal to 80% (for example, more than or equal to 90%). All of contact surface p and contact surface n may be rough surfaces (R). In this condition (1), the area of contact surface p and the area of contact surface n may be read as the area of the embedded part of the anode lead terminal and the area of the embedded part of the cathode lead terminal, respectively.

(2) The developed area ratio of the interface of rough surface (R) is more than or equal to 0.4. The developed area ratio of the interface may be less than or equal to 10.0, or may be in the above exemplified range.

(3) Rough surface (R) is formed from the boundary between the embedded part and the exposed part to the inside of the exterior body. Rough surface (R) may be formed to extend from the embedded part to the exposed part to be also formed on at least a part of the exposed part.

At least one base material selected from the group consisting of a base material of the anode lead terminal and a base material of the cathode lead terminal may be a copper base material. In this case, at least a part of the copper base material in the exposed part may be covered with a copper plating layer. In a preferred example, both the base material of the anode lead terminal and the base material of the cathode lead terminal are copper base materials. In this case, at least a part of both the copper base materials may be covered with a copper plating layer. All the surfaces of the exposed part may be covered with a copper plating layer.

A rolled copper plate can be used as the copper base material (lead frame). However, the rolled copper plate has metallographic structures extending along a rolling direction. When the rolled copper plate is punched to produce the lead frame, depending on a direction in which the rolled copper plate is punched, a direction of a peak line at a bending position of the lead terminal and a direction in which the metallographic structures extend may be substantially parallel. In this case, on a peak side of the bending position, an interval between the metallographic structures is widened by bending, and cracks may occur. As a result, tensile stress is applied to a plating layer (for example, a tin plating layer) formed on the copper base material, and thus, cracks may occur in the plating layer to cause deterioration of solder wettability.

In a case where surfaces of the copper base material are directly covered with the tin plating layer, an alloy layer of copper and tin is formed between the copper base material and the tin plating layer by heat during mounting. Since the alloy layer of copper and tin is harder and less likely to extend than copper and tin, stress generated by the cracks of the copper base material cannot be alleviated so that the alloy layer is likely to be cracked. As a result, cracks are also generated in the tin plating layer, and the solder wettability may deteriorate. By forming the copper plating layer on the copper base material, the stress due to the cracks of the copper base material can be alleviated by the copper plating layer having excellent ductility. In addition, the copper plating layer has good affinity with the copper base material containing copper as a main component, and easily fills irregularities generated by the cracks of the copper base material. As a result, the occurrence of the cracks in the copper plating layer and the plating layer covering the copper plating layer is suppressed, and the deterioration in the solder wettability is suppressed. Thus, reliability of electrical connection between the solid electrolytic capacitor and an external substrate can be enhanced. Note that, since the copper plating layer has a metallographic structure perpendicular to a extending direction of the copper base material, the copper base material and the copper plating layer that covers the copper base material can be distinguished from each other by, for example, microscopic observation, and a boundary between the copper base material and the copper plating layer can be identified.

A thickness of the copper plating layer is preferably more than or equal to 2 μm. By setting the thickness to be more than or equal to 2 μm, the tensile stress generated by the cracks of the copper base material can be effectively alleviated. The occurrence of the cracks of the copper plating layer and the plating layer covering the copper plating layer can be effectively suppressed. As a result, an effect of suppressing the deterioration in the solder wet/ability can be enhanced. The thickness of the copper plating layer may be, for example, less than or equal to 10 μm or less than or equal to 15 μm.

The copper base material may have a bent part bent along the outer surface of the exterior body in the exposed part. In this case, a surface on an outside of the bent part may be covered with the copper plating layer. Since high stress is applied to the bent part, it is preferable to cover the bent part with the copper plating layer.

The solid electrolytic capacitor (more specifically, the lead terminal) according to the present exemplary embodiment may further include a tin plating layer that covers the copper plating layer. In this case, the solid electrolytic capacitor (more specifically, the lead terminal) may further include another layer disposed between the copper plating layer and the tin plating layer. The other layer may be an alloy layer of copper and tin or a nickel plating layer. By the tin plating layer, the solder wettability can be enhanced, and the reliability of the electrical connection between the solid electrolytic capacitor and the external substrate can be enhanced. Note that, in a case where the tin plating layer is formed on the copper plating layer, tin (Sn) in the tin plating layer is diffused into the copper plating layer by heat during mounting, and the alloy layer of copper and tin may be formed between the copper plating layer and the tin plating layer. The nickel plating layer may be formed between the copper plating layer and the tin plating layer.

The solid electrolytic capacitor (more specifically, the lead terminal) according to the present exemplary embodiment may further include a noble metal plating layer that covers the copper plating layer. The noble metal plating layer may contain at least one selected from the group consisting of gold, platinum, and palladium.

The solid electrolytic capacitor (more specifically, the lead terminal) according to the present exemplary embodiment may further include a nickel plating layer disposed between the copper plating layer and the noble metal plating layer.

Hereinafter, the layer formed on the base material of the lead terminal (such as the plating layer described above) may be referred to as a "covering layer".

Example of Constituent Members of Capacitor Element

Examples of constituent members of the capacitor element (solid electrolytic capacitor element) will be described below. Known constituent members may be used as constituent members other than characteristic parts of the present disclosure. Note that the capacitor element is not particularly limited as long as the effect of the present disclosure is obtained, and a capacitor element other than the capacitor element to be described below (for example, a known capacitor element) may be used.

Anode Part

The anode part includes an anode body. The anode body may include a valve metal, an alloy containing the valve metal, a compound containing the valve metal, or the like. These materials may be used alone or in combination of two or more types thereof. As the valve metal, for example, aluminum, tantalum, niobium, or titanium is preferably used. The anode body having the porous part on its surface is obtained, for example, by roughening the surface of a metal foil containing a valve metal. The roughening may be performed by electrolytic etching or the like. The entire anode body may be porous. However, from the viewpoint of strength, the anode body preferably includes: a porous part disposed on each of both principal surfaces; and a core part disposed between the porous parts. Porosity of the core part is lower than the porosity of the porous part. The porous part is a region having a large number of fine pores. The core part is, for example, a region that is not subjected to electrolytic etching.

Dielectric Layer

The capacitor element includes a dielectric layer disposed between the anode part and the cathode part. The dielectric layer is an insulating layer that functions as a dielectric material. The dielectric layer may be formed by anodizing the valve metal of the surface of the anode body (for example, a metal foil). The dielectric layer may be formed to cover at least part of the anode body (anode part). The dielectric layer is normally disposed on the surface of the anode body. Since the dielectric layer is disposed on the surface of the porous part of the anode body, the dielectric layer is disposed along inner wall surfaces of holes and hollows (also referred to as pits) in the surface of the anode body.

The typical dielectric layer includes oxides of the valve metal. For example, when tantalum is used as the valve metal, the typical dielectric layer contains $Ta_2O_5$, and when aluminum is used as the valve metal, the typical dielectric layer contains $Al_2O_3$. Note that the dielectric layer is not limited thereto, and any dielectric layer may be used as long as the dielectric layer functions as a dielectric material.

Cathode Part

The cathode part includes a solid electrolyte layer that covers at least part of the dielectric layer and may further include a cathode lead-out layer covering at least part of the solid electrolyte layer. Hereinafter, the solid electrolyte layer and the cathode lead-out layer will be described.

Solid Electrolyte Layer

For example, a layer containing a conductive polymer can be used as the solid electrolyte layer. The solid electrolyte layer may further contain at least one selected from the group consisting of a dopant and another additive agent as necessary in addition to the conductive polymer. Examples of the dopant include, but are not limited thereto, p-toluenesulfonic acid, naphthalenesulfonic acid, and polystyrenesulfonic acid (PSS).

As the conductive polymer, a π-conjugated conductive polymer can be used, for example. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. The abovementioned polymer also includes a homopolymer, a copolymer of two or more types of monomers, and derivatives of these polymers (a substitute having a substituent group group). For example, polythiophene includes poly (3,4-ethylenedioxythiophene) and the like. However, these are merely examples, and the conductive polymer is not limited to these examples.

Cathode Lead-Out Layer

A layer having conductivity can be used as the cathode lead-out layer. For example, a layer containing conductive particles, a metal foil, or the like may be used for the cathode lead-out layer. Examples of the conductive particles include conductive carbon and metal particles. The cathode lead-out layer may include a first layer and a second layer stacked in this order from the solid electrolyte layer side. In one example, a layer containing conductive carbon is used for the first layer, and a layer containing metal particles or a metal foil may be used for the second layer. Examples of the conductive carbon include graphite (artificial graphite, natural graphite, or the like). Examples of the metal particles include silver particles. The layer containing conductive particles may be formed by using a composition containing conductive particles and a resin (binder resin), or may be formed by using a metal paste (for example, silver paste).

Solid Electrolytic Capacitor

The solid electrolytic capacitor according to the present exemplary embodiment includes at least one capacitor element. The number of capacitor elements included in the solid electrolytic capacitor may be in a range from 1 to 20, inclusive (for example, in a range from 2 to 10, inclusive).

In a case where the electrolytic capacitor includes a plurality of capacitor elements, the capacitor elements may be stacked. Usually, ends of anode bodies of the stacked capacitor elements are electrically connected to each other. For example, the ends of the anode bodies may be joined by welding. The anode lead terminal may be connected to the ends of the anode bodies.

Normally, the cathode lead-out layers of the stacked capacitor elements are electrically connected to each other. The cathode lead terminal is joined to the cathode lead-out layer of at least one capacitor element. The cathode lead terminal may be joined to the cathode lead-out layer with a conductive adhesive or solder interposed therebetween. Alternatively, the cathode lead terminal may be joined to the cathode lead-out layer by welding (resistance welding, laser welding, or the like). The conductive adhesive is, for example, a mixture of a curable resin and carbon particles or metal particles.

As described above, the solid electrolytic capacitor includes the exterior body that covers the capacitor element. The exterior body also covers a part (embedded part) of the anode lead terminal and a part (embedded part) of the cathode lead terminal. The exterior body preferably contains a cured product of a curable resin composition, and may contain a thermoplastic resin or a composition containing a thermoplastic resin. The curable resin composition may contain a curable resin and a filler. The curable resin is preferably a thermosetting resin.

The curable resin composition may contain a filler, a curing agent, a polymerization initiator, a catalyst, and the like in addition to the curable resin. Examples of the curable resin include epoxy resin, phenol resin, urea resin, polyimide, polyamide-imide, polyurethane, diallyl phthalate, and unsaturated polyester. The curable resin composition may contain a plurality of curable resins.

Examples of the filler include insulating particles (inorganic particles and organic particles) and insulating fibers. Examples of an insulating material constituting the filler include insulating compounds (oxides, and the like) such as silica and alumina, glass, and mineral materials (talc, mica, clay, and the like). A kind of the filler contained in the exterior body may be only one kind or two or more kinds, A content proportion of the filler in the exterior body may be in a range from 10 mass % to 90 mass %, inclusive.

As the thermoplastic resin, for example, polyphenylene sulfide (PPS), polybutylene terephthalate (PBT), or the like may be used. The composition containing the thermoplastic resin may contain the above-described fillers and the like in addition to the thermoplastic resin.

The solid electrolytic capacitor according to the present exemplary embodiment may further include a case arranged outside the exterior body (resin composition). Examples of the resin material forming the case include a thermoplastic resin or a composition containing the thermoplastic resin. Examples of the metallic material forming the case include metal such as aluminum, copper, or iron, or alloy thereof (also including stainless steel, brass, and the like).

Lead Terminal

As described above, the anode lead terminal and the cathode lead terminal each include the embedded part and the exposed part. The anode lead terminal and the cathode lead terminal can be formed by a known material and a known method except for the part of rough surface (R). As described above, each of the anode lead terminal and the cathode lead terminal may be formed by processing a metal sheet (including a metal plate and a metal foil) made of metal (copper, copper alloy, or the like). That is, examples of materials of the base materials of the anode lead terminal and the cathode lead terminal include copper and a copper alloy.

One end of the anode lead terminal (an end of the embedded part) is connected to the anode part. One end of the cathode lead terminal (an end of the embedded part) is connected to the cathode part (for example, the cathode lead-out layer). Each of the exposed part of the anode lead terminal and the exposed part of the cathode lead terminal can function as a terminal portion to be soldered when the solid electrolytic capacitor is mounted.

Methods for Manufacturing Solid Electrolytic
Capacitor Element and Solid Electrolytic Capacitor A method for manufacturing a solid electrolytic capacitor according to the present exemplary embodiment is not particularly limited. Known manufacturing methods may be applied to these manufacturing methods except for the method for forming rough surface (R), or a part of the known manufacturing methods may be modified and applied.

An example of the method for manufacturing a solid electrolytic capacitor according to the present exemplary embodiment will be described below. However, the solid electrolytic capacitor according to the present exemplary embodiment may be manufactured by a method other than the method to be described below. The matters described for the solid electrolytic capacitor can be applied to the following manufacturing method, and thus, redundant description may be omitted. In addition, the matters described in the following manufacturing method can be applied to the solid electrolytic capacitor according to the present exemplary embodiment.

First, the capacitor elements, the anode lead terminal, and the cathode lead terminal are produced (step (i)). A method for producing the capacitor elements is not particularly limited, and the capacitor element can be formed by a known method. In a case where the solid electrolytic capacitor including the plurality of stacked capacitor elements is manufactured, the plurality of capacitor elements are stacked. In this case, the anode parts of the plurality of capacitor elements are connected to each other by welding or the like as necessary. Further, the cathode parts of the plurality of capacitor elements are connected to each other by a conductive paste or the like as necessary.

Subsequently, the anode lead terminal is electrically connected to the anode parts of the capacitor elements, and the cathode lead terminal is electrically connected to the cathode parts of the capacitor elements (step (ii)). These connection methods are not particularly limited, and a known connection method may be applied. For example, the anode parts and the anode lead terminal may be connected by welding or the like. The cathode parts and the cathode lead terminal may be connected by a conductive paste or the like.

Subsequently, the capacitor elements, the embedded part of the anode lead terminal, and the embedded part of the cathode lead terminal are covered with the exterior body (step (iii)). The exterior body may be formed by using a molding technique such as injection molding, insert molding, or compression molding.

This manufacturing method includes step (I) of manufacturing the lead terminal (anode lead terminal and/or cathode lead terminal) having rough surface (R). Step (I) includes step (a) of processing a metal sheet (base material) into a predetermined shape by press working or the like, and step (b) of forming rough surface (R). Step (I) may further include step (c) of forming the covering layer (forming, plating layer, on the base material. Either step (a) or step (b) may precede.

In a case where step (I) includes step (c), the order of step (a), step (b), and step (c) is not particularly limited as long as rough surface (R) is finally formed in a predetermined region. Meanwhile, when the covering layer is formed on the surface having rough surface (R) after rough surface (R) is formed, the developed area ratio of the interface of rough surface (R) may be reduced. In this case, step (b) may be performed after step (c) is performed. Alternatively, after rough surface (R) is formed in step (b), step (c) of forming the covering layer only in a region that is not required to be rough surface (R) may be performed. Step (c) may be performed before step (iii) of covering the capacitor elements and the embedded part of the lead terminal with the exterior body. Alternatively, after step (iii), step (c) may be performed to form the covering layer only on the exposed part of the lead terminal.

Step (a) of processing the metal sheet (base material) into a predetermined shape by press processing or the like can be performed by a known method.

Step (b) of forming rough surface (R) may be performed by, for example, a sandblasting method, a roughening plating method, a roughening etching method, or the like. The sand blasting method is preferable in that quick processing can be performed and cost performance is excellent. The roughening plating method is preferable from the viewpoint of low cost. The roughening etching method is preferable in that unevenness is small and fine roughness can be formed. In addition, unlike the sandblasting method, the roughening plating method and the roughening etching method have an advantage that beads (projection materials) do not remain.

A method for roughening the surfaces of the lead terminal by the sandblasting method or the like has been performed in the related art. However, under the conditions of the related art, the adhesion between the exterior body and the lead terminal was not sufficient. In the method of the present disclosure, roughening is performed under the condition in which the developed area ratio of the interface of the rough surface is more than or equal to 0.4.

By decreasing a particle size of the particles (projection materials) (for example, by increasing a yarn count of the particles), it is possible to increase a developed area ratio of an interface of the sandblasted surface. Thus, in this method, sandblasting is usually performed by using particles smaller than particles used for roughening the lead terminal in the related art. Further, by increasing the number of shots of sandblasting, the developed area ratio of the interface of the sandblasted surface can be increased to some extent. When the particle size of the particles (projection materials) is too small, the developed area ratio of the interface may be small. However, the condition in which the developed area ratio of the interface of the rough surface is more than or equal to 0.4 can be easily determined by an experiment. The particles (projection materials) used for sandblasting are not particularly limited, and alumina particles or garnet particles may be used.

When rough surface (R) is formed by the roughening plating method, the developed area ratio Sdr of the interface can be set to be more than or equal to 0.4 by, for example, increasing a surface area by forming needle-like or particulate plating. For example, a proportion of the needle-like or particulate plating may be increased.

In a case where rough surface (R) is formed by the roughening etching method, for example, a surface area can be increased by forming a roughened shape by using a difference between an etching rate of crystal grain boundaries and an etching rate of crystal grains (crystal grain boundaries have a high etching rate), and as a result, the developed area ratio Sdr of the interface can be set to be more than or equal to 0.4. For example, a ratio between the crystal grain boundaries and the crystal grains in the metal may be changed by selecting the metal to be the material of the lead terminal, or the difference in the etching rate may be changed by changing an etching condition.

As described above, rough surface (R) of which the developed area ratio of the interface is more than or equal to 0.4 is formed on the lead terminal. The covering layer (layer on the base material) formed in step (c) may be formed by a known method (for example, a known plating method). In this manner, the solid electrolytic capacitor can be manufactured.

An example of the exemplary embodiment according to the present disclosure will be specifically described below with reference to the drawings. The above-described components can be applied to components of examples to be described below. In addition, the examples to be described below can be modified on the basis of the above description. In addition, the matters described below may be applied to the exemplary embodiment described above. In addition, in the exemplary embodiments to be described below, components that are not essential to the solid electrolytic capacitor of the present disclosure may be omitted. The solid electrolytic capacitor to be described below may be manufactured by the method described above.

First Exemplary Embodiment

Figure 1:
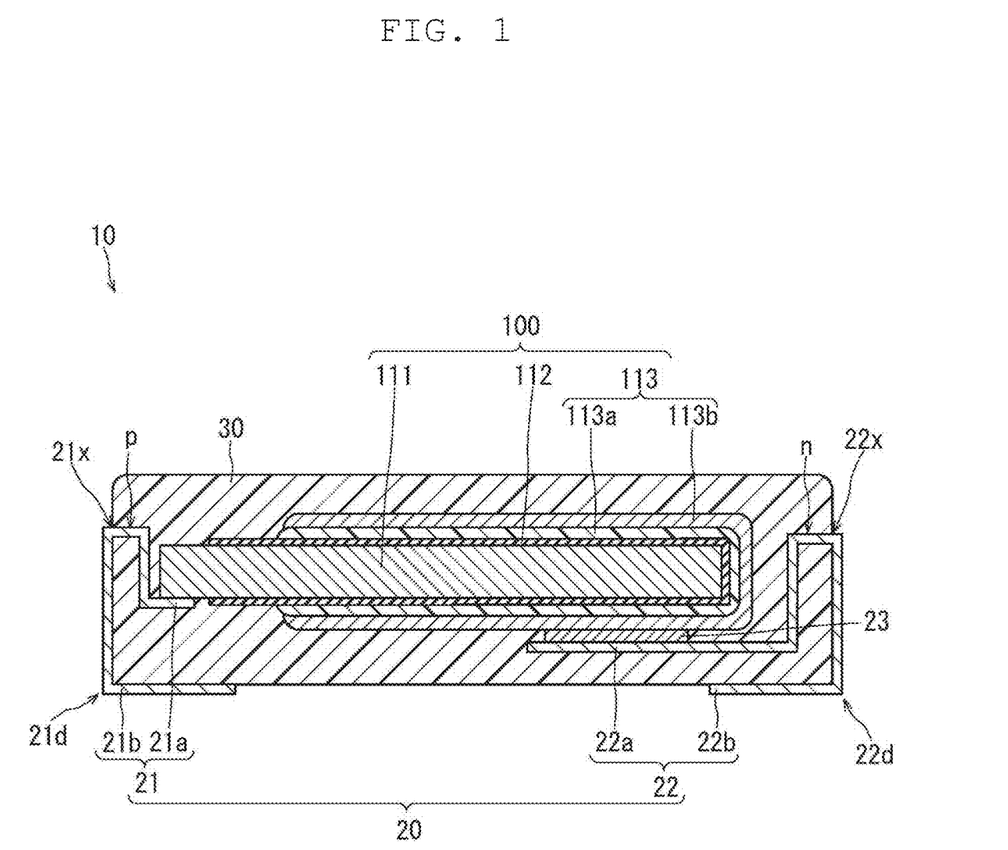
FIG. 1 is a cross-sectional view schematically illustrating an example of a solid electrolytic capacitor according to a first exemplary embodiment of the present disclosure.

FIG. 1 is a cross-sectional view schematically illustrating a solid electrolytic capacitor according to a first exemplary embodiment. Solid electrolytic capacitor 10 illustrated in FIG. 1 includes capacitor element 100, lead terminal 20, and exterior body 30. Lead terminal 20 includes anode lead terminal 21 electrically connected to anode part (anode body) 111 of capacitor element 100, and cathode lead terminal 22 electrically connected to cathode part 113 of capacitor element 100.

Capacitor element 100 includes anode part (anode body) 111, dielectric layer 112 covering at least part of anode part 111, and cathode part 113 that covers at least part of dielectric layer 112. Cathode part 113 includes solid electrolyte layer 113a covering at least part of dielectric layer 112, and cathode lead-out layer 113b that covers at least part of solid electrolyte layer 113a.

Anode lead terminal 21 includes embedded part 21a embedded in exterior body 30 and exposed part 21b exposed from exterior body 30. Cathode lead terminal 22 includes embedded part 22a embedded in exterior body 30 and exposed part 22b exposed from exterior body 30. FIG. 1 illustrates boundary 21x between embedded part 21a and exposed part 21b and boundary 22x between embedded part 22a and exposed part 22b.

One end of anode part 111 is electrically connected to embedded part 21a of anode lead terminal 21 by welding or the like. Cathode part 113 (specifically, cathode lead-out layer 113b) of capacitor element 100 is electrically connected to embedded part 22a of cathode lead terminal 22 by conductive paste 23.

Embedded part 21a has contact surface p in contact with exterior body 30. Embedded part 22a has contact surface n in contact with exterior body 30. Contact surface p and/or contact surface n has rough surface (R) described above. In the part of rough surface (R), the adhesion between exterior body 30 and lead terminal 20 is enhanced. Thus, it is possible to suppress the intrusion of oxygen or the like through the interface between exterior body 30 and lead terminal 20. As a result, deterioration of capacitor element 100 can be suppressed, and long-term reliability of solid electrolytic capacitor 10 can be enhanced.

Anode lead terminal 21 and/or cathode lead terminal 22 may include the above-described covering layer. The covering layer is preferably formed to cover bent parts 21d and 22d bent along an outer surface of exterior body 30 in exposed parts 21b and 22b.

An example of the electrolytic capacitor according to the present exemplary embodiment may include a plurality of stacked capacitor elements 100. In this case, one ends of anode parts 111 of the plurality of capacitor elements 100 are joined by welding or the like, and at least one anode part 111 is connected to anode lead terminal 21. Cathode parts 113 of the plurality of capacitor elements 100 are connected by a conductive paste or the like, and at least one cathode part 113 is connected to cathode lead terminal 22 by a conductive paste or the like. That is, the plurality of capacitor elements 100 are connected in parallel. In this case, contact surface p and/or contact surface n also has rough surface (R).

Example

The solid electrolytic capacitor according to the present disclosure will be described in more detail with reference to Example.

Production and Evaluation of Solid Electrolytic Capacitor

A plurality of kinds of solid electrolytic capacitors were produced by a method to be described below. Each of the solid electrolytic capacitors includes one capacitor element. The solid electrolytic capacitor and the capacitor element have structures similar to the structures of solid electrolytic capacitor 10 and capacitor element 100 illustrated in FIG. 1, respectively.

First, both surfaces of an aluminum foil (thickness: 100 μm) were roughened by etching to produce an anode body (anode part). Subsequently, a dielectric layer (aluminum oxide layer) was formed on the anode body by performing anodization in a state where a part of the anode body was immersed in an anodizing solution.

Subsequently, a solid electrolyte layer was formed on the dielectric layer by the following method. First, an aqueous solution containing a pyrrole monomer and p-toluenesulfonic acid was prepared. The anode body on which the dielectric layer was formed and a counter electrode were immersed in the obtained aqueous solution to perform electrolytic polymerization. A solid electrolyte layer was formed by this electrolytic polymerization.

Subsequently, graphite particles and a dispersion material (cellulose derivative or the like) were wet-pulverized together with water by using a bead mill to obtain a dispersion. The dispersion was applied to a surface of the solid electrolyte layer, and then dried. In this manner, a carbon layer was formed on the surface of the solid electrolyte layer. Subsequently, a silver paste containing silver particles and a binder resin (epoxy resin) was applied to a surface of the carbon layer, and a metal paste layer was formed by heating. Through these steps, a cathode lead-out layer including the carbon layer and the metal paste layer was formed. In this manner, the capacitor element was produced as described above.

A copper sheet (thickness: 100 μm) for forming an anode lead terminal and a cathode lead terminal was prepared. Subsequently, a part to be an embedded part of the anode lead terminal and a part to be an embedded part of the cathode lead terminal were roughened to form a rough surface. Thereafter, a metal sheet was processed to form a shape of the anode lead terminal and a shape of the cathode lead terminal.

The roughening was performed by a sand blasting method, a roughening plating method, and a roughening etching method. In the sand blasting method, the developed area ratio Sdr of the interface was changed by changing an average particle size of blast beads (projection materials such as alumina particles and garnet particles). In the roughening plating method and the roughening etching method, the developed area ratio Sdr of the interface was increased by the method described above. In order to evaluate the roughness of the formed rough surface, arithmetic mean height Sa and developed area ratio Sdr of an interface were measured for the formed rough surface. Note that, in capacitor C1 that was not roughened, arithmetic mean height Sa and developed area ratio Sdr of the interface were measured for the roughness of the surface of the lead terminal.

Developed area ratio Sdr of the interface was measured according to ISO 25178. Similarly, arithmetic mean height Sa was measured according to ISO 25178.

Subsequently, one end of the anode part of the capacitor element was connected to the anode lead terminal. In addition, the cathode part of the capacitor element was connected to a cathode lead terminal with a conductive paste. Subsequently, the capacitor elements, a part (embedded part) of the anode lead terminal, and a part (embedded part) of the cathode lead terminal were covered by molding. In this manner, an electrolytic capacitor having a structure similar to the structure of the electrolytic capacitor illustrated in FIG. 1 was produced.

In this example, 100 samples for each of seven kinds of solid electrolytic capacitors (capacitors C1, C2, and A1 to A5), in which the method for forming the rough surface (roughening method) ware changed, were produced by changing. The used roughening method is shown in Table 1. In the sandblasting of capacitors C2 and A1 to A3, the developed area ratio of the interface was changed by changing the average article size of the blast beads (projection materials) used as shown in Table 1 to be described later. Specifically, the average article size of the blast beads used in the sandblasting of capacitor C2 was used as a reference, and a ratio of the average particle size to the average particle size was changed as shown in Table 1. For example, the average article size of the blast beads used in the sandblasting of capacitor A1 is ½ of the average particle size of the blast beads used in the sandblasting of capacitor C2. Note that conditions for sandblasting of capacitor C2 are conditions for sandblasting that have been used in the related art.

The produced capacitor was heat-treated under the same conditions as in a solder fellow step peak temperature: 260° C. for 10 seconds). An airtight defect rate of the capacitor after the heat treatment was evaluated.

The airtight defect rate was evaluated by a gross leek test. Specifically, a capacitor was housed in a small capsule, and a minute pressure drop caused by an internal pressure in the small capsule leaking into an exterior body of the capacitor was measured. The capacitor having a large pressure change was determined as an airtight defect. A part of the conditions for manufacturing the capacitor and evaluation results are shown in Table 1.

TABLE 1

| Capacitor | Roughening method | Average particle size of sandblasted beads | Arithmetic means height Sa [μm] | Developed area ratio of interface Sdr | Airtight defect rate after heat treatment |
|---|---|---|---|---|---|
| C1 | No processing | — | 0.1 | 0.2 | 60% |
| C2 | Sandblasting | Reference | 2.2 | 0.3 | 35% |
| A1 | Sandblasting | ½ of reference | 1.8 | 0.4 | 0% |
| A2 | Sandblasting | ⅕ of reference | 1.5 | 0.6 | 0% |
| A3 | Sandblasting | 1/7 of reference | 0.2 | 0.4 | 0% |
| A4 | Roughening plating | — | 0.8 | 4.0 | 0% |
| A5 | Roughening etching | — | 0.3 | 0.6 | 0% |

As shown in Table 1, by setting developed area ratio Sdr of the interface to be more than or equal to 0.4, the airtight defect rate after the heat treatment could be significantly reduced. Arithmetic mean height Sa of the sandblasted surface of capacitor C2 is significantly increased as compared with capacitor C1, and it can be seen that the surface is roughened by the sandblasting. However, the airtight defect rate of capacitor C2 after the heat treatment was still high. Although arithmetic mean height Sa of rough surfaces of capacitors A1 to A5 was lower than the arithmetic mean height of capacitor C2, the airtight detect rates of capacitors A1 to A5 were significantly lower than the airtight defect rate of capacitor C2. This indicates that the evaluation method used in the related art has not been able to perform proper evaluation.

Figure 2:
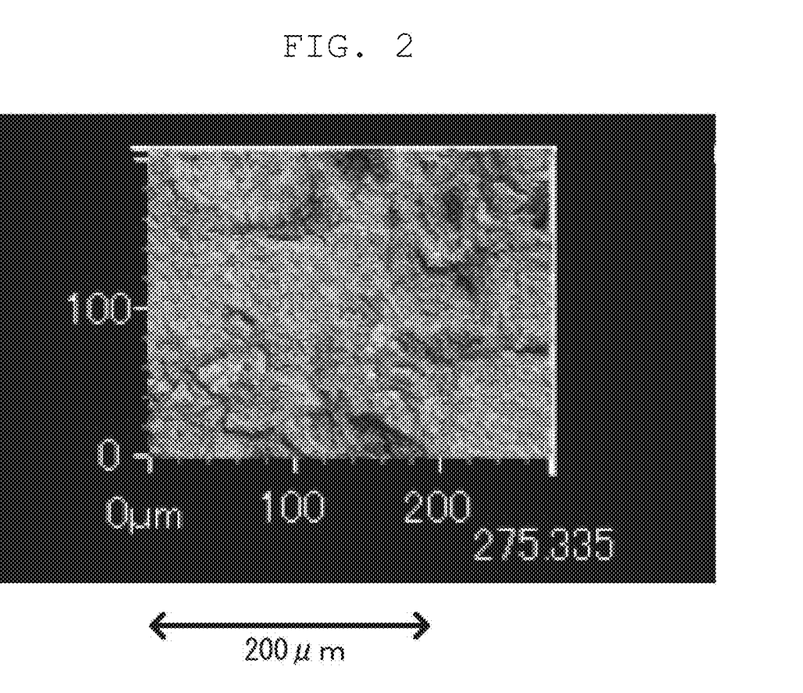
FIG. 2 is an example image illustrating a state of a rough surface of capacitor C2.
Figure 3:
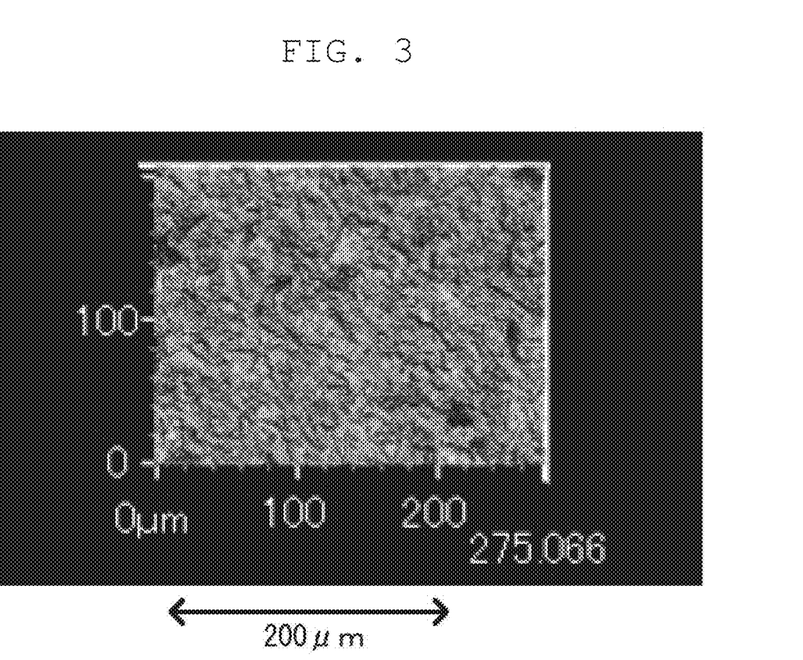
FIG. 3 is an example image illustrating a state of a rough surface of capacitor A2.

FIG. 2 illustrates an example image illustrating a state of irregularities of a part of the rough surface of capacitor C2, and FIG. 3 illustrates an image of capacitor A2. As illustrated in FIG. 2, in the rough surface of capacitor C2, an area of one recess and an area of one protrusion are large, and the recess and the protrusion are biased. On the other hand, fine irregularities are uniformly dispersed on the rough surface of capacitor A2.

The present disclosure can be used for solid electrolytic capacitor elements and solid electrolytic capacitors.

The invention claimed is:

1. A solid electrolytic capacitor comprising:
   at least one capacitor element that includes an anode part and a cathode part;
   an anode lead terminal electrically connected to the anode part; and
   a cathode lead terminal electrically connected to the cathode part; and
   an exterior body that covers the at least one capacitor element,
   wherein:
   each of the anode lead terminal and the cathode lead terminal includes an embedded part and an exposed part, the embedded part being embedded in the exterior body, the exposed part being connected to the embedded part and being exposed from the exterior body, at least one base material selected from the group consisting of a base material of the anode lead terminal and a base material of the cathode lead terminal is a copper base material, at least a part of the copper base material in the exposed part is covered with a copper plating layer, the copper plating layer is covered with a tin plating layer, an alloy layer of copper and tin is disposed between the copper plating layer and the tin plating layer, the embedded part of the anode lead terminal includes a first contact surface in contact with the exterior body, the embedded part of the cathode lead terminal includes a second contact surface in contact with the exterior body, and at least one contact surface selected from the group consisting of the first contact surface and the second contact surface includes a rough surface having a developed area ratio of an interface of more than or equal to 0.4.

2. The solid electrolytic capacitor according to claim 1, wherein the rough surface extends from the embedded part to the exposed part to be disposed on at least a part of the exposed part.

3. The solid electrolytic capacitor according to claim 1, wherein each of the first contact surface and the second contact surface includes the rough surface.

4. The solid electrolytic capacitor according to claim 1, wherein the rough surface has the developed area ratio of the interface of less than or equal to 10.0.

5. The solid electrolytic capacitor according to claim 1, wherein:

the copper base material includes a bent part bent along an outer surface of the exterior body in the exposed part, and a surface on an outside of the bent part is covered with the copper plating layer.

6. The solid electrolytic capacitor according to claim 1, further comprising a noble metal plating layer that covers the copper plating layer, wherein the noble metal plating layer includes at least one selected from the group consisting of gold, platinum, and palladium.

7. The solid electrolytic capacitor according to claim 6, further comprising a nickel plating layer disposed between the copper plating layer and the noble metal plating layer.

* * * * *